United States Patent [19]

Martino

[11] Patent Number: 5,501,306
[45] Date of Patent: Mar. 26, 1996

[54] BRAKE ROTOR WITH A HEAT-RESISTANT CERAMIC COATING

[76] Inventor: Gerald Martino, P.O. Box 202, New Stanton, Pa. 15672

[21] Appl. No.: 257,873

[22] Filed: Jun. 10, 1994

[51] Int. Cl.$^6$ .................................................. F16D 65/10
[52] U.S. Cl. ........................ 188/218 XL; 188/264 AA; 188/264 G; 428/564
[58] Field of Search ................... 188/218 A, 218 XL, 188/264 AA, 264 A, 264 G; 192/107 M, 113.2; 428/564, 469, 472

[56] References Cited

U.S. PATENT DOCUMENTS

| | | | |
|---|---|---|---|
| 2,451,709 | 10/1948 | Baselt | 188/218 XL |
| 3,655,425 | 4/1972 | Longo et al. | 428/564 |
| 3,672,849 | 6/1972 | Bredzs et al. | 428/564 X |
| 3,809,192 | 5/1974 | Stehle | 188/218 XL |
| 4,290,510 | 9/1981 | Warren | 188/218 XL |
| 4,508,788 | 4/1985 | Cheney | 428/564 X |
| 4,848,521 | 7/1989 | Izumine | 188/218 XL |
| 5,224,572 | 7/1993 | Smolen, Jr. et al. | 188/218 XL |
| 5,325,941 | 7/1994 | Farinacci et al. | 188/218 XL |

FOREIGN PATENT DOCUMENTS

| | | | |
|---|---|---|---|
| 94646 | 6/1983 | Japan | 188/218 XL |
| 5231453 | 9/1993 | Japan | 188/218 XL |
| 652821 | 5/1951 | United Kingdom | 188/264 A |

OTHER PUBLICATIONS

Mustang Monthly article "How to:Install '94–'95 GT Baer Racing Brakes" p. 98,100. Jan. 1995.

Primary Examiner—Robert J. Oberleitner
Assistant Examiner—Kevin D. Rutherford
Attorney, Agent, or Firm—Ian K. Samways

[57] ABSTRACT

A brake rotor having a brake ring, first and second opposing braking surfaces, and inner and outer peripheral surfaces connecting the braking surfaces. A plurality of apertures are disposed through the brake ring and extend between the two braking surfaces. A ceramic coating, for providing thermal insulation, is disposed at least on the two braking surfaces.

20 Claims, 3 Drawing Sheets

BRAKE ROTOR WITH A HEAT-RESISTANT CERAMIC COATING

BACKGROUND OF THE INVENTION

1. Field of the Invention

The present invention generally relates to brake rotors for motor vehicles, and more particularly to brake rotors which are suitable for use on race cars.

2. Background Information

In automobile racing, as well as in other contexts relating to motor vehicles, there can be several critical factors which may influence the performance of the vehicle in question. One important factor is weight, in that an excessively heavy vehicle may not be able to perform effectively. This factor may, for example, have a decisive influence on the speed and fuel economy of the vehicle. Another important factor may be the ability for the vehicle to brake effectively. Particularly, the ability of the vehicle to stop quickly and efficiently, as well as the need to prevent excessive overheating of the brakes, can be tremendously important.

Conventionally, brake rotors have been formed of cast iron or steel, and often do not have a coating for serving as a thermal barrier.

A disadvantage often encountered with such rotors is excessive weight, both in terms of unsprung weight and rotating weight. Such excessive weight may often result in poor fuel economy, as well as an inhibited capability to accelerate. Typically, such a rotor may weigh approximately fifteen pounds, which would typically result in a total weight, for four brake rotors in a vehicle, of about sixty pounds. This has long been considered to be excessive for certain contexts, particularly for the context of race cars.

In conventional rotors, braking problems may also result from a coefficient of friction which may not be as high as desired for certain applications, such as in the context of race cars. In the case of conventional cast iron rotors, another disadvantage often encountered is the presence of voids or stresses in the casting.

It has been known that the weight of conventional rotors can be reduced by utilizing a lighter material, such as aluminum. If, for example, a lightweight rotor, which may include aluminum, is provided in a vehicle, such as a race car, the unsprung weight and rotating weight of the vehicle may be reduced by as much as forty-eight pounds, particularly if each rotor weighs only about three or four pounds.

It has also been known to coat the braking surfaces of a brake rotor with ceramic, in order to provide a higher coefficient of friction than would normally be encountered with a plain cast iron or steel rotor. To date, such ceramics have often included a variety of materials. However, problems relating to durability may be experienced in these contexts. Particularly, in many known applications, it has been found that the ceramic coating may have a tendency to develop cracks with increased use, especially if high braking temperatures are created at the surface of the ceramic coating.

U.S. Pat. No. 5,224,572 discloses the provision of a ceramic coating on each of the two braking surfaces of an aluminum rotor. As disclosed therein, a plurality of circumferentially spaced cooling apertures are arranged between the braking surfaces. The apertures extend radially, between the large central aperture of the rotor and the outer circumference of the rotor, and essentially act to vent away excessive heat. However, it has been found that this aluminum veined rotor is not necessarily provided with as significant a degree of thermal protection as may often be desired in certain contexts, such as in the context of a racing car. Further, it has also been found that this aluminum veined rotor does not necessarily provide as great a reduction in either unsprung weight or rotating weight as may otherwise be desired in certain contexts, such as in the context of a racing car.

OBJECT OF THE INVENTION

It is an object of the present invention to provide a brake rotor which overcomes the disadvantages discussed above in relation to known types of brake rotors. More specifically, the invention seeks to provide an optimally functionable brake rotor which has the characteristics of reduced weight and increased thermal protection, and can be produced at reasonable cost.

SUMMARY OF THE INVENTION

The above objects, among others, are achieved by the present invention in the provision of a ceramic coating which includes a nickel, in accordance with parameters discussed more fully herebelow. It has been found, surprisingly, that such a ceramic coating, in the context of a brake rotor, provides a highly cost- effective composition for providing thermal protection to a greater degree than previously encountered with other brake rotors. Additionally, according to at least one preferred embodiment of the present invention, there are preferably a series of apertures, passages or holes drilled between the braking surfaces of the rotor. This characteristic has also been found, surprisingly, to increase ventilation and thereby further contribute to the dissipation of high temperatures at the surface of the brake rotor. Further, it has been found that the ceramic coating according to the present invention is surprisingly durable, even around the apertures, where it might otherwise be expected that significant damage to the coating may occur.

In accordance with at least one preferred embodiment of the present invention, the brake rotor is manufactured from high carbon, stress-relieved steel. This appears to provide the advantages of avoiding the types of voids or stresses which may be present in a cast iron product. Additionally, the use of plate steel appears to allow for less expansion and contraction and appears to allow for a significantly high bond strength and tensile strength. Compared with a conventional rotor, anywhere from about five to about eight pounds of rotating weight may be saved. Further, a rotor manufactured in accordance with at least one preferred embodiment of the present invention can provide a reduction in weight of about twelve ounces in comparison with a veined aluminum rotor.

Generally, in view of the features disclosed by the present invention, it is possible to provide a brake rotor which has reduced weight and increased thermal insulation in comparison with known brake rotors. It is essentially possible, by virtue of the present invention, to also provide a brake rotor which has a reduced thickness when compared with other known brake rotors.

In summary, one aspect of the invention resides broadly in a racing car brake rotor comprising: a brake ring; the brake ring comprising means for connecting to a racing car braking system, wherein such a braking system comprises: a hub, means for mounting the brake ring on the hub, a caliper, brake shoes being mounted on the caliper, friction pads being mounted on respective brake shoes, and means for applying a force to the caliper to selectively displace the brake shoes to bring the friction pads into braking contact with the brake ring; the means for connecting having at least one connection portion, each of the at least one connection portion having at least one physical dimension configured for connection with the hub of the braking system; the brake ring having first and second opposing braking surfaces, the first and second braking surfaces being oriented generally parallel to one another; the first and second braking surfaces having means for being contacted by the friction pads of the braking system; the brake ring defining a central rotational axis being generally perpendicular to the first and second braking surfaces; the brake ring having: an inner peripheral surface, disposed towards the central rotational axis and generally connecting the first and second braking surfaces; and an outer peripheral surface, disposed away from the central rotational axis and generally connecting the first and second braking surfaces; a plurality of apertures being disposed through the brake ring and extending between the first and second braking surfaces; the plurality of apertures being configured for dissipating heat during a braking operation of the rotor; and a ceramic coating disposed at least on the first and second braking surfaces, the ceramic coating being configured for providing thermal insulation for the brake rotor.

Another aspect of the invention resides broadly in a racing car steel brake rotor comprising: a brake ring; the brake ring comprising means for connecting to a racing car braking system, wherein such a braking system comprises a hub, means for mounting the brake ring on the hub, a caliper, brake shoes being mounted on the caliper, friction pads being mounted on respective brake shoes, means for applying a force to the caliper to selectively displace the brake shoes to bring the friction pads into braking contact with the brake ring; the means for connecting having at least one connection portion, each of the at least one connection portion having at least one physical dimension configured for connection with the hub of the braking system; the brake ring having first and second opposing braking surfaces, the first and second braking surfaces being oriented generally parallel to one another; the first and second braking surfaces having means for being contacted by the friction pads of the braking system; the brake ring defining a central rotational axis being generally perpendicular to the first and second braking surfaces; the brake ring having: an inner peripheral surface, disposed towards the central rotational axis and generally connecting the first and second braking surfaces; and an outer peripheral surface, disposed away from the central rotational axis and generally connecting the first and second braking surfaces; a plurality of apertures being disposed in the brake ring, the plurality of apertures being configured for dissipating heat during a braking operation of the rotor; and a ceramic coating disposed at least on the first and second braking surfaces, the ceramic coating being configured for providing thermal insulation for the brake rotor.

Another aspect of the invention resides broadly in a method of making a brake rotor, such a brake rotor comprising: a brake ring; the brake ring having first and second opposing braking surfaces, the first and second braking surfaces being oriented generally parallel to one another; the brake ring defining a central rotational axis being generally perpendicular to the first and second braking surfaces; the brake ring having: an inner peripheral surface, disposed towards the central rotational axis and generally connecting the first and second braking surfaces, and an outer peripheral surface, disposed away from the central rotational axis and generally connecting the first and second braking surfaces; a plurality of apertures being disposed in the brake ring, the plurality of apertures being configured for dissipating heat during a braking operation of the rotor; a heat-reflecting ceramic coating disposed on the first and second braking surfaces; and the ceramic coating consisting essentially of a composition comprising at least about 5 percent nickel by volume; the method comprising the steps of: providing a brake ring; configuring the brake ring to have first and second opposing braking surfaces, the first and second braking surfaces being oriented generally parallel to one another; defining a central rotational axis to be generally perpendicular to the first and second braking surfaces; the step of providing the brake ring comprising: providing an inner peripheral surface, disposed towards the central rotational axis and generally connecting the first and second braking surfaces; and providing an outer peripheral surface, disposed away from the central rotational axis and generally connecting the first and second braking surfaces; disposing a plurality of apertures in the brake ring; configuring the plurality of apertures for dissipating heat during a braking operation of the rotor; providing a heat-reflecting ceramic coating and disposing the ceramic coating on the first and second braking surfaces; and configuring the ceramic coating to consist essentially of a composition comprising at least about five percent nickel by volume.

BRIEF DESCRIPTION OF THE DRAWINGS

The present invention will be more readily appreciated with reference to the accompanying drawings, in which.

DESCRIPTION OF THE PREFERRED EMBODIMENTS

Figure 1:
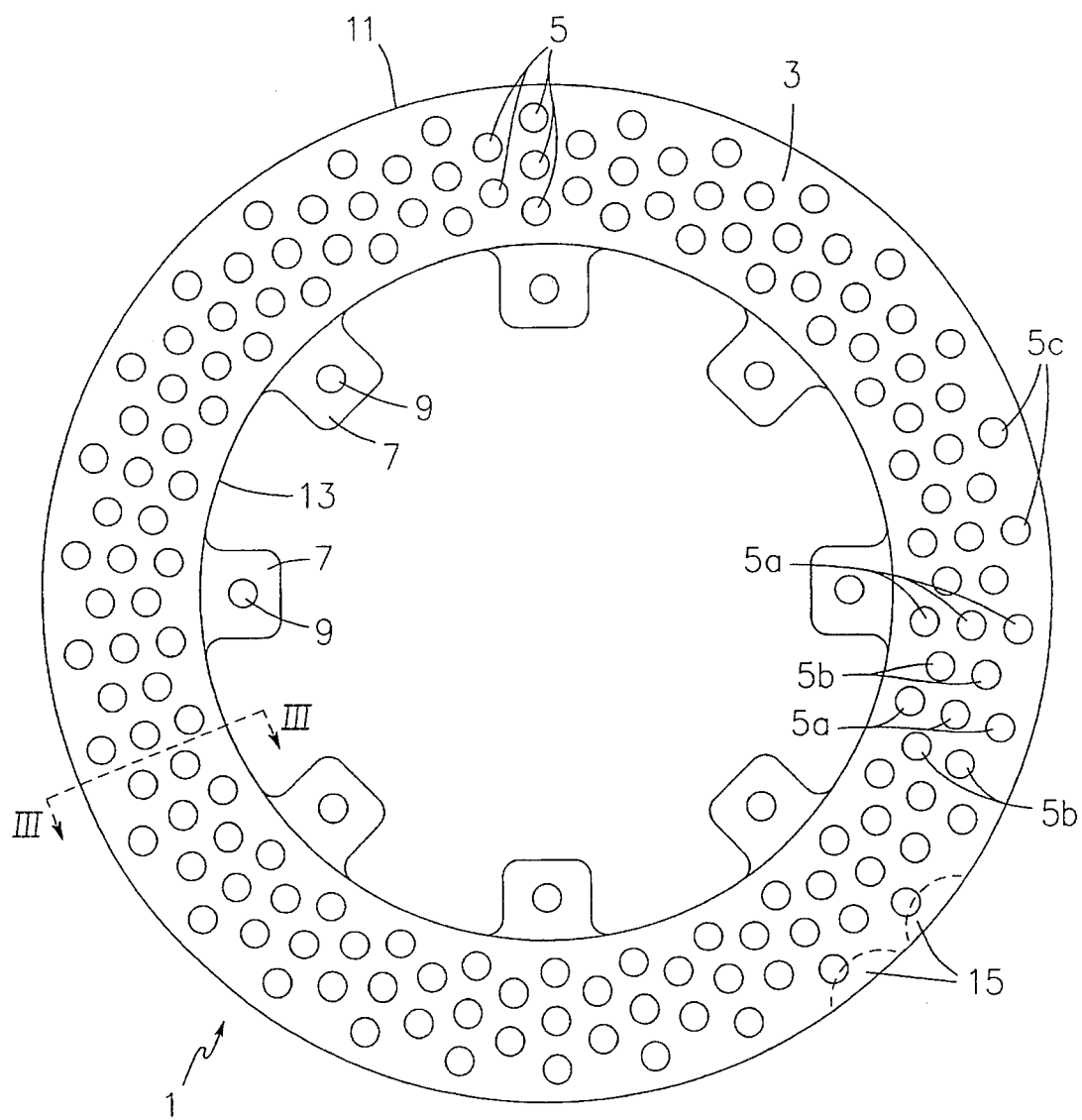
FIG. 1 shows a plan view of a brake rotor according to the present invention.

In accordance with a preferred embodiment of the present invention, as illustrated in FIG. 1, brake rotor 1, preferably ring-like in shade, preferably includes two opposite braking surfaces 3, one of which is shown in FIG. 1. The braking surfaces are preferably oriented parallel to one another.

Preferably disposed through the brake rotor 1 are a plurality of holes, passages or apertures 5, which preferably extend from one braking surface 3 to the opposite braking surface 3. The holes, passages or apertures 5 preferably extend through the entire thickness of the brake rotor 1, preferably in a direction perpendicular to the braking surfaces 3.

As shown in FIG. 1, in accordance with a preferred embodiment of the present invention, the holes, passages or apertures 5 are preferably distributed about substantially the entire circumferential extent of the brake rotor 1. Preferably, holes, passages or apertures 5 are distributed in a substantially uniform array about the circumference of brake rotor 1. Preferably, the holes, passages or apertures 5 may be distributed in such a way as to provide considerably reduced weight in comparison with a similar rotor having no holes, while still allowing optimal functionality of the rotor 1. This optimal functionability would include, for example, the ability of the brake rotor 1 to provide sufficient braking via the application of friction pads against the braking surfaces 3.

In the context of race cars, it has been found that an array of holes, passages or apertures 5 similar to that illustrated in FIG. 1, can help provide these optimal characteristics. Preferably, with regard to each braking surface, in accordance with at least one embodiment of the present invention, the removed surface area represented by the holes or apertures 5 may represent about 60 percent of the total surface area of the braking surface in question. Within the scope of the present invention, however, this figure could be between about 55 percent and about 65 percent of the total surface area of the braking surface in question. Alternatively, within the scope of the present invention, this figure could be between about 45 percent and about 65 percent of the total surface area of the braking surface in question. Additionally, this figure may also be one of the following: 40% or less, 70%, or 75% or more, or any value intermediate to any of the values mentioned heretofore.

The rotor 1 preferably has an outer peripheral surface 11 and an inner peripheral surface 13, both of which surfaces 11, 13 preferably connect both braking surfaces 3 with each other.

A plurality of lugs 7, preferably eight in number, are preferably arranged uniformly about the inner peripheral surface 13 of the rotor 1 and extend radially inwardly. Each lug 7 is preferably appropriately provided with a hole 9 for connection with a hub member.

Figure 2:
FIG. 2 shows an elevational view of the brake rotor illustrated in FIG. 1.

FIG. 2 is an elevational view of the brake rotor illustrated in FIG. 1. Preferably, the outer peripheral surface 11 (see FIG. 1) of the rotor 1 is indented about substantially its entire circumference with a groove 17.

The disclosure now briefly turns to an illustrative example of a brake rotor according to the present invention, with physical dimensions. Reference can be made to both FIG. 1 and FIG. 2.

As an illustrative example, rotor 1 may have an outer diameter, at outer peripheral surface 11, of about 11.75" and an inner diameter, at inner peripheral surface 13, of about 8.75". Accordingly, the radial dimension of the ring constituted by the rotor 1, as measured between outer peripheral surface 11 and inner peripheral surface 13, may be about 1.5".

There may be sixty sets of apertures 5 distributed about the rotor 1, each set of apertures having two or three apertures, wherein all of the apertures within each set may be aligned along a common radius of the rotor 1. There may be two alternating patterns 5a, 5b of apertures among the sixty sets of apertures, as follows:

thirty sets 5a of the apertures may be constituted by three apertures each, wherein the two apertures closer to the center of the rotor may have a diameter of about ⅜" and the aperture furthest away from the center of the rotor, indicated at 5c, may have a diameter of about 5/16", and wherein the apertures may be substantially evenly spaced; and thirty sets 5b of the apertures may be constituted by two apertures each, wherein each aperture has a diameter of about ⅜".

In accordance with at least one preferred embodiment of the present invention, between outer apertures 5c of respective sets 5a, generally along the outer circumference of rotor 1, there may preferably be what may be considered bights of material 15, indicated schematically by dotted lines in FIG. 1, projecting into the general pattern of apertures 5. In other words, the positioning of outer apertures 5c relative to the sets of apertures 5b may preferably be such that a noticeable amount of plate material exists between the radially outermost aperture of each set 5b and the outer peripheral surface 11. As an example, the distance between the radially outermost point on the radially outermost aperture 5 of a set of apertures 5b and the outer peripheral surface 11 of rotor 1 may be about 11/32", whereas the distance between the radially outermost point of an aperture 5c and the outer peripheral surface 11 of rotor 1 may be about ⅛". Thus, a bight, or encroachment, of material 15, towards the center of the rotor 1, may be seen repeatedly about the outer circumference of the rotor 1. Conceivably, the presence of these bights 15 may, in the presence of apertures 5, aid in braking, by creating a somewhat expanded locus of contact between a friction pad and a braking surface 3.

The brake rotor 1 may have an overall thickness of about ¼". The axial dimension of the circumferential groove 17, defined parallel to the thickness of the rotor 1 and perpendicular to the braking surfaces 3, may be about 3/32".

Each lug 7 may have a radial dimension, defined along a radius of rotor 1, of about ¾", and may have a transverse dimension, defined generally transverse to the radial dimension, of about 15/16". Each hole 9 may have a diameter of about 11/32".

Each hole 5 is preferably bevelled at each braking surface 3. Additionally, each hole 9 is preferably bevelled at each opposing surface of the corresponding lug 7.

It has been found that a rotor having dimensions and characteristics as set forth hereinabove may have a weight of about 3 lbs., 9 or 10 ounces; that is, 57 or 58 ounces.

It will be understood that the foregoing merely represents an example for the purposes of illustration, and that brake rotors having different dimensions, and different arrangements of apertures, are conceivable within the scope of the present invention. For example, it is conceiveable to provide apertures not in the form of circular holes, but in the form of circumferentially oriented slits or perforations.

It will also be understood that, in accordance with at least one preferred embodiment of the present invention, the dimensions set forth heretofore may conceivably vary by a factor of about plus or minus one-third of the cited dimension, especially in the case of smaller dimensions. Other dimensions and proportions, relating to the illustrative example set forth heretofore, may be divined from FIG. 1, as FIG. 1 may be considered to be essentially drawn to scale with relation to the illustrative example set forth heretofore.

Figure 3:
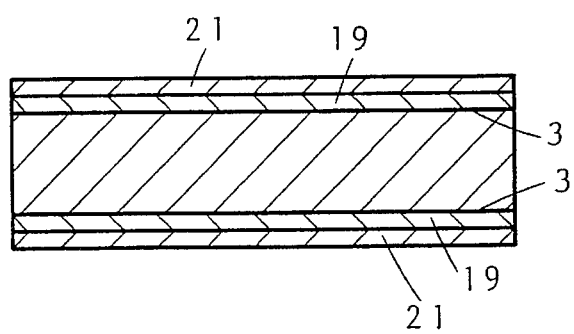
FIG. 3 is a cross-section, taken along line III—III of FIG. 1, which schematically illustrates different layers associated with a brake rotor according to the present invention.

FIG. 3 provides a detailed, and essentially highly exaggerated, view of a cross-section of rotor 1, the cross-section being taken along line III—III of FIG. 1. As illustrated schematically in FIG. 3, each braking surface 3 preferably has disposed thereupon a bonding layer 19 and a thermal barrier layer 21. The particular composition of these layers will be discussed more fully herebelow, as well as methods for applying the same to the braking surfaces 3. Generally, however, bonding layer 19 may preferably include a thin layer of nickel, whilst the thermal barrier layer 21 may preferably include, in accordance with at least one preferred embodiment of the present invention, a mixture of nickel and zirconium. Preferably, bonding layer 7 and thermal barrier layer 9 will each have been applied to the braking surfaces 3 by plasma spraying techniques which are well known to those of ordinary skill in the art.

Figure 4:
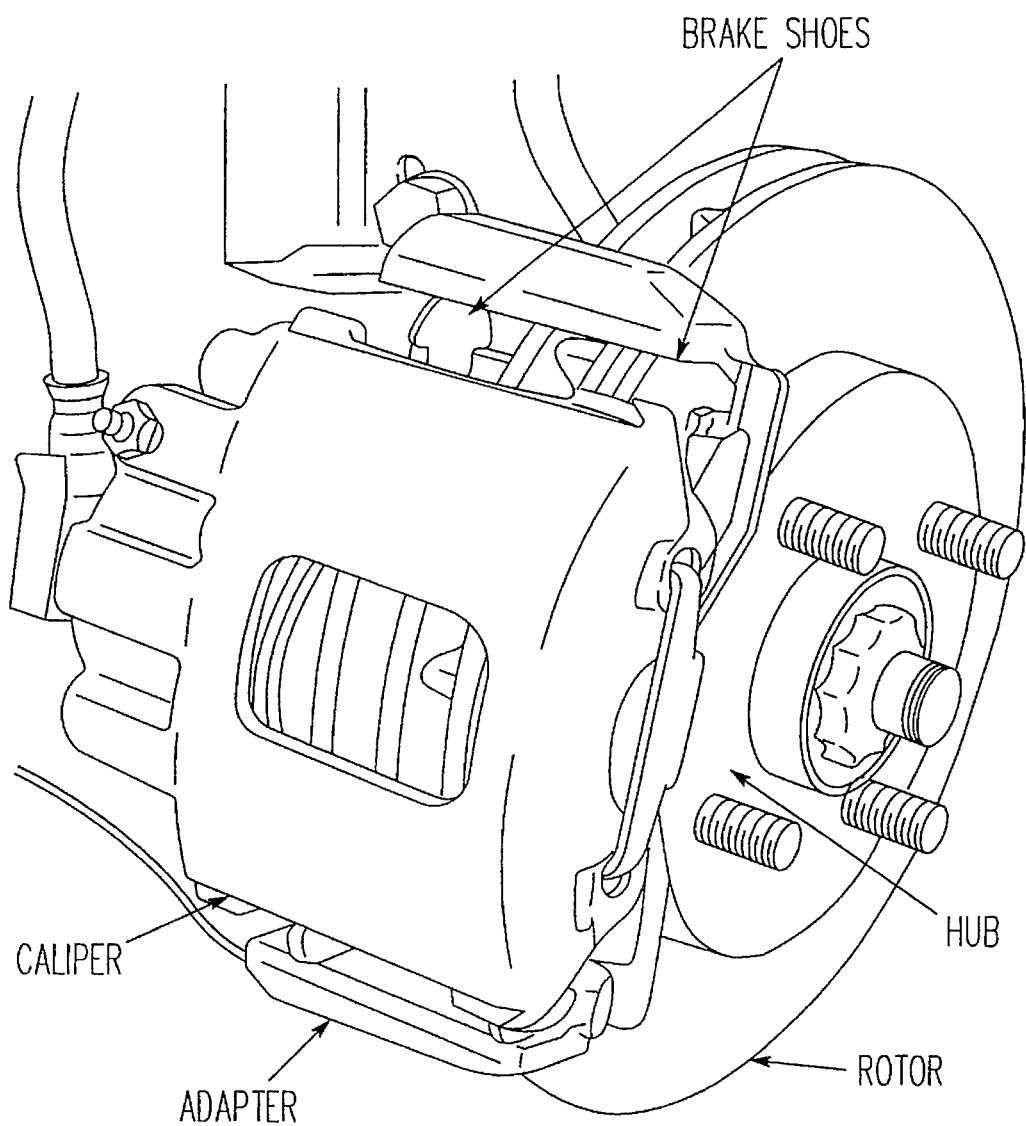
FIG. 4 illustrates a typical brake assembly in which a brake rotor according to the present invention may be employed.

FIG. 4 illustrates a typical brake assembly in which a brake rotor according to the present invention may be employed. Various components of the brake assembly are indicated by name. It will be understood that the "brake shoes" may essentially be considered as including friction pads.

The disclosure now turns to a discussion of a preferred method for forming a brake rotor in accordance with the present invention. For this purpose, reference may be made to FIGS. 1–3.

Fundamentally, brake rotor 1 may preferably be formed from a high-carbon stress relieved steel. The rotor may then be provided with apertures 5, preferably in an array characterized in a similar vein as the array described heretofore with relation to the illustrative example. Additionally, the rotor may preferably be provided with the aforementioned circumferential groove 17 by an appropriate method. Such a method for providing a circumferential groove is generally well-known to those of ordinary skill in the art and will not be described in further detail here.

Preferably, the rotor 1 is sand-blasted in preparation for receipt of the aforementioned coatings 19, 21 on the respective braking surfaces 3. Suitable sand-blasting techniques are generally well-known to those of ordinary skill in the art and will not be described in further detail herein. Subsequent to sand-blasting, the braking surfaces 3 of the rotor are preferably bond-coated with nickel to about 0.005 inches. The nickel is preferably applied by a plasma-spraying technique. The temperature maintained during the plasma spraying process may preferably be between about 10,000° F. and about 12,000° F.

Although the preferred thickness of the bond coating has been cited hereinabove as about 0.005 inches, and has been found to produce essentially optimal results, it will be appreciated that satisfactory results can also be achieved with thicknesses slightly higher or lower than 0.005 inches. Particularly, it is conceivable, within the scope of the present invention, to provide a thickness of about 0.003 inches, about 0.0035 inches, about 0.004 inches, about 0.0045 inches, about 0.0055 inches, about 0.006 inches, about 0.0065 inches or about 0.007 inches. Values lower than 0.003 inches or higher than 0.007 inches may also produce satisfactory results.

The outer ceramic coating 21 is preferably also provided by a plasma-spraying technique, preferably to a thickness of between about 0.01 inches and about 0.03 inches. Preferably, the outer ceramic coating essentially preferably includes primarily zirconium, but preferably includes between about 10 percent and about 20 percent nickel by volume. Within the scope of at least one embodiment of the present invention, however, the presence of nickel could be essentially considered to be between about 10 percent and about 25 percent. Alternatively, within the scope of at least one preferred embodiment of the present invention, this figure could be essentially considered to be between about 5 percent and about 25 percent.

It will be understood, then, that, in accordance with at least one preferred embodiment of the present invention, the content of nickel in the outer ceramic coating may preferably be about 10%, about 11%, about 12%, about 13%, about 14%, about 15%, about 16%, about 17%, about 18%, about 19% or about 20%. Generally, a ceramic coating containing zirconium and about 15 to 20% nickel by volume generally provides highly favorable results. Values outside the range of about 10% to about 20% may also produce satisfactory results, such as: about 5%, about 6%, about 7%, about 8%, about 9%, about 21%, about 22%, about 23%, about 24%, about 25%, about 26%, about 27%, about 28%, about 29%, or about 30%.

Additionally, it will be understood that, in accordance with at least one preferred embodiment of the present invention, the thickness of the ceramic coating may preferably be about 0.01 inches, about 0.015 inches, about 0.02 inches, about 0.025 inches or about 0.03 inches. Values outside the range of about 0.01 inches to about 0.03 inches may also produce satisfactory results, such as: about 0.005 inches, about 0.006 inches, about 0.007 inches, about .0008 inches, about 0.009 inches, about 0.031 inches, about 0.032 inches, about 0.033 inches, about 0.034 inches and about 0.035 inches.

Conceivably, in accordance with at least one preferred embodiment of the present invention, the nickel employed could originate from the same source as the nickel utilized for the bond-coating process, thus economizing on the materials used.

Conceivably, in accordance with at least one alternative preferred embodiment of the present invention, the bond coating could be constituted nickel chromium or nickel alumide. Preferably, the bond coating 19 possesses expansion and contraction properties intermediate those of the metal ring of the brake rotor and of the ceramic coating.

Conceivably, in accordance with at least one alternative preferred embodiment of the present invention, the ceramic coating, in addition to the nickel, could be constituted by stabilized zirconium or other zirconium-based ceramic.

It has been found that, generally, a ceramic coating as described hereinabove can essentially reflect heat in such a way that the coating retains its original color, that is the color of the coating prior to a braking operation, at braking temperatures of up to about 1200° F.

Preferably, in accordance with at least one preferred embodiment of the present invention, each of the lugs 7 is uncoated, that is, does not have disposed thereupon either bonding layer 19 or ceramic coating 21.

Preferably, in accordance with at least one preferred embodiment of the present invention, the interior surfaces of the holes 5 will have both the bond coating and ceramic coating disposed thereupon, for thermal protection.

In at least one preferred embodiment of the present invention, there may preferably be, in the vehicle, in which the rotor is mounted, one or more air ducts leading to the vicinity of the rotor in question. Such air ducts, which may conceivably include one or more conduits for introducing fresh air generally from the front of the vehicle to the vicinity of the rotor in question, are generally well-known to those of ordinary skill in the art and, as such, will not be described in more detail herein.

To recapitulate, in accordance with at least one preferred embodiment of the present invention, a brake rotor according to the present invention may preferably encompass the following characteristics:

the rotor is preferably made of a high carbon stress relieved steel;

the rotor may preferably have essentially any diameter from about seven inches to about fifteen inches;

the rotor is preferably made so as to have a thickness of between about 0.200" and 0.750", and is preferably drilled with variously sized holes to lighten the rotor;

the holes are preferably drilled perpendicularly with respect to the rotor, so as to essentially resemble "Swiss cheese";

the rotor is preferably sand blasted and bond-coated with a high temperature nickel plasma spray, to a thickness of about 0.005";

on top of the bond coat, a zirconium plasma spray, preferably having characteristics as described heretofore, is preferably sprayed on the rotor, to a thickness of preferably between about 0.010" and 0.030", as a thermal barrier;

Additionally, in accordance with at least one preferred embodiment of the present invention, it will be appreciated that a brake rotor according to the present invention can essentially exhibit the following advantages:

the use of plate steel allows for less expansion and contraction and allows for very high bond strength, as well as very high tensile strength;

the thermal characteristics of the ceramics essentially allows the rotors to be drilled and ground thinner, allowing the use of a much lighter rotor in comparison to a veined rotor or conventional rotor, including an aluminum rotor;

compared to a conventional rotor, anywhere from about five to about eight pounds of rotating weight may be saved;

a rotor, according to at least one preferred embodiment of the present invention, can out-stop a conventional rotor because of the ceramics having a higher coefficient of friction than a plain cast iron or steel rotor;

a rotor, according to at least one preferred embodiment of the present invention, having steel as described heretofore, can weigh about twelve ounces less than a veined aluminum rotor of comparable size;

a rotor, according to at least one preferred embodiment of the present invention, can be considerably stronger than a conventional cast-iron rotor because of being made of rolled plate, not a cast product, wherein a cast product could have voids or stresses built into the casting;

a rotor, according to at least one preferred embodiment of the present invention, could have many uses, including the provision of an average automobile with less rotating weight, which could, in turn, result in better acceleration and fuel economy; and a rotor, according to at least one preferred embodiment of the present invention, could be suited for a very wide variety of racing vehicles or other types of performance vehicles, from "go-karts", to "Indy" cars, to drag racers, to "monster trucks", and conceivably could be suited for "funny cars".

Thus, although the brake rotor according to the present invention may essentially be considered to be suitable for NASCAR race cars, it may be suitable for several other types of racing or performance vehicles, as well.

Examples of racing car brakes, and components relating thereto, which may be utilized in accordance with the embodiments of the present invention, may be found in the following U.S. Pat. Nos. 5,281,004, which issued to O'Leary on Jan. 25, 1994; and No. 4,772,299, which issued to Bogusz on Sept. 20, 1988.

Examples of air ducts and other cooling arrangements for brake assemblies, which may be utilized in accordance with the embodiments of the present invention, may be found in the following U.S. Pat. Nos. 5,121,818, which issued to McComic on Jun. 16, 1992; No. 4,620,616, which issued to martin on Nov. 4, 1986; No. 5,002,160, which issued to Weiler et al. on Mar. 26, 1991; and No. 4,533,184, which issued to Muller et al. on Aug. 6, 1985.

Examples of plasma-spraying techniques, and general examples of ceramics, which may be utilized in accordance with the embodiments of the present invention, may be found in the following U.S. Pat. Nos. 4,290,510, which issued to Warren on Sept. 22, 1981; No. 5,302,465, which issued to Miller et al. on Apr. 12, 1994; No. 5,238,742, which issued to Freeman et al. on Aug. 24, 1993; No. 5,176,964, which issued to Marousek et al. on Jan. 5, 1993; and No. 4,877,705, which issued to Polidor on Oct. 31, 1989.

Examples of high carbon stress relieved steels, which may be utilized in accordance with the embodiments of the present invention, may be found in the following U.S. Pat. Nos. 4,430,130, which issued to Sorensen on Feb. 7, 1984; No. 3,900,347, which issued to Lorenzetti et al. on Aug. 19, 1975; and No. 4,533,390, which issued to Sherby et al. on Aug. 6, 1985.

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A racing car brake rotor comprising:

a solid brake ring;

said brake ring comprising means for connecting to a racing car braking system;

said means for connecting having at least one connection portion, each of said at least one connection portion having at least one physical dimension configured for connection with a hub of a braking system;

said brake ring having first and second opposing braking surfaces, said first and second braking surfaces being oriented generally parallel to one another;

said first and second braking surfaces having means for being contacted by friction pads of a braking system;

said brake ring defining a central rotational axis being generally perpendicular to said first and second braking surfaces;

said brake ring having:
an inner peripheral surface, disposed towards said central rotational axis and generally connecting said first and second braking surfaces; and
an outer peripheral surface, disposed away from said central rotational axis and generally connecting said first and second braking surfaces;

a plurality of apertures being disposed through said brake ring, said plurality of apertures extending through said brake ring between said first and second braking surfaces;

said plurality of apertures being configured for dissipating heat during a braking operation of said rotor;

a ceramic coating disposed at least on said first and second braking surfaces, said ceramic coating being configured for providing thermal insulation for said brake rotor said plurality of apertures comprise:
a set of smaller apertures and a set of larger apertures;
each of said set of smaller apertures being disposed radially closer to said outer peripheral surface than are said larger apertures;
a plurality of sets of two apertures, wherein each set of said plurality of sets of two apertures comprises two of said larger apertures; and
a plurality of sets of three apertures, wherein each set of said plurality of sets of three apertures comprises at least one of said larger apertures and at least one of said smaller apertures.

2. The racing car brake rotor according to claim 1, wherein said brake ring is formed from steel.

3. The racing car brake rotor according to claim 2, wherein said ceramic coating consists essentially of a composition comprising at least about five percent nickel by volume.

4. The racing car brake rotor according to claim 3, wherein said plurality of apertures are oriented in a generally perpendicular direction with respect to said first and second braking surfaces.

5. The racing car brake rotor according to claim 4, wherein;
said plurality of apertures are arranged in a substantially uniform pattern over substantially the entire circumferential extent of said brake ring;
said first and second braking surfaces each have a total surface area, as defined between said outer peripheral portion and said inner peripheral portion;
said plurality of apertures constitute a removed surface area on each of said first and second braking surfaces, the removed surface area constituted by said plurality of apertures being between about 55 percent and about 65 percent of the total surface area of each of said first and second braking surfaces; and
said plurality of apertures are disposed so as to provide a plurality of bight portions distributed substantially uniformly about the circumference of said brake ring, each of said bight portions extending radially inwardly from said outer peripheral surface of said brake ring, each of said bight areas having a surface area of the metal material of said brake ring sufficient for providing a locus of expanded contact with a friction pad of a brake assembly.

6. The racing car brake rotor according to claim 5, wherein:
the removed surface area constituted by said plurality of apertures is about 60 percent of the total surface area of each of said first and second braking surfaces;
said ceramic coating has an original color prior to a braking operation;
said ceramic coating has means for reflecting heat during a braking operation so as to substantially maintain the original color of said ceramic coating at braking temperatures of up to about 1200° F.;
said brake rotor further comprises a bond coating disposed on both of said first and second braking surfaces, between the corresponding one of said first and second braking surfaces and said ceramic coating;
said bond coating consisting essentially of nickel;
said composition of said ceramic coating consists essentially of:
between about 10 percent and about 20 percent nickel by volume; and
a zirconium-based ceramic;
said plurality of apertures are disposed through said brake ring and extend between said first and second braking surfaces;
said plurality of sets of two apertures comprise thirty sets of two apertures;
said plurality of sets of three apertures comprise thirty sets of three apertures;
each of said thirty sets of two apertures comprising:
a first aperture and a second aperture;
said first aperture and said second aperture both being aligned substantially along a common radius of said brake rotor;
said first aperture being one of said larger apertures;
said second aperture being one of said larger apertures;
each of said thirty sets of three apertures comprising:
a third aperture, a fourth aperture and a fifth aperture;
said third, fourth and fifth apertures all being aligned substantially along a common radius of said brake rotor;
said third aperture being one of said larger apertures;
said fourth aperture being one of said larger apertures; and
said fifth aperture being one of said smaller apertures;
each of said apertures being a generally circular hole;
each of said first, second, third and fourth apertures having a substantially equal diameter;
said fifth aperture having a diameter equal to between about three-fourths and about seven-eighths of the diameter of each of said first, second, third and fourth apertures;
said thirty sets of two apertures and said thirty sets of three apertures being disposed in an alternating relationship with one another about the circumference of said brake ring;
each of said bight portions being generally defined between:
a first one of said fifth apertures;
a second one of said fifth apertures, the second one of said fifth apertures neighboring said first one of said fifth apertures; and
one of said second apertures, said one of said apertures being disposed, with respect to a circumferential direction of said brake ring, between said first one of said fifth apertures and said second one of said fifth apertures;
said brake ring having an outer diameter of between about 7 and about 15 inches;
said ceramic coating having been applied by plasma spraying;
said bond coating having been applied by plasma spraying;
said at least one connection portion comprises a plurality of lugs extending inwardly from said inner peripheral surface of said brake ring, for providing connection with a hub;
said plurality of lugs is eight lugs, said eight lugs being substantially uniformly distributed about said inner peripheral surface of said brake ring;
each of said plurality of lugs has a hole disposed therethrough to facilitate mounting of said brake ring on a hub;
said bond coating has a thickness of about 0.005";
said ceramic coating has a thickness of between about 0.010" and about 0.030"; and
said steel of said brake ring consists essentially of a high carbon stress relieved steel.

7. The racing car brake rotor according to claim 1, wherein said plurality of apertures are oriented in a generally perpendicular direction with respect to said first and second braking surfaces.

8. The racing car brake rotor according to claim 7, wherein said brake ring is formed from steel.

9. A racing car steel brake rotor comprising:
a brake ring, said brake ring being formed from steel;
said brake ring comprising means for connecting to a racing car braking system;

said means for connecting having at least one connection portion, each of said at least one connection portion having at least one physical dimension configured for connection with a hub of a braking system;

said brake ring having first and second opposing braking surfaces, said first and second braking surfaces being oriented generally parallel to one another;

said first and second braking surfaces having means for being contacted by friction pads of a braking system;

said brake ring defining a central rotational axis being generally perpendicular to said first and second braking surfaces;

said brake ring having:
an inner peripheral surface, disposed towards said central rotational axis and generally connecting said first and second braking surfaces; and
an outer peripheral surface, disposed away from said central rotational axis and generally connecting said first and second braking surfaces;

a plurality of apertures being disposed in said brake ring, said plurality of apertures being configured for dissipating heat during a braking operation of said rotor;

a ceramic coating disposed at least on said first and second braking surfaces, said ceramic coating being configured for providing thermal insulation for said brake rotor;

said plurality of apertures comprise:
a set of smaller apertures and a set of larger apertures;
each of said set of smaller apertures being disposed radially closer to said outer peripheral surface than are said larger apertures;
a plurality of sets of two apertures, wherein each set of said plurality of sets of two apertures comprises two of said larger apertures; and
a plurality of sets of three apertures, wherein each set of said plurality of sets of three apertures comprises at least one of said larger apertures and at least one of said smaller apertures.

10. The racing car steel brake rotor according to claim 9, wherein said ceramic coating consists essentially of a composition comprising at least about five percent nickel by volume.

11. The racing car steel brake rotor according to claim 10, wherein:
said composition of said ceramic coating comprises between about ten percent and about twenty-five percent nickel by volume.

12. The racing car steel brake rotor according to claim 11, wherein said composition of said ceramic coating comprises between about 10 percent and about 20 percent nickel by volume; and
said steel of said brake ring consists essentially of a high carbon stress relieved steel.

13. The racing car steel brake rotor according to claim 12, wherein:
said ceramic coating has an original color prior to a braking operation;
said ceramic coating has means for reflecting heat during a braking operation so as to substantially maintain the original color of said ceramic coating at braking temperatures of up to about twelve hundred degrees fahrenheit;
said racing car brake rotor comprising a bond coating disposed on both of said first and second braking surfaces, between the corresponding one of said first and second braking surfaces and said ceramic coating; and
said bond coating consists essentially of nickel.

14. The racing car steel brake rotor according to claim 13, wherein:
said plurality of apertures are disposed through said brake ring;
said plurality of apertures extend through said brake ring between said first and second braking surfaces; and
said brake ring is a solid brake ring.

15. The racing car steel brake rotor according to claim 14, wherein:
said plurality of apertures are arranged in a substantially uniform pattern over substantially the entire circumference of said brake ring;
said composition of said ceramic coating consists essentially of:
between about 10 percent and about 20 percent nickel by volume; and
a zirconium-based ceramic;
said first and second braking surfaces each have a total surface area;
said plurality of apertures constitute a removed surface area on each of said first and second braking surfaces, the removed surface area constituted by said plurality of apertures being about 60 percent of the total surface area of each of said first and second braking surfaces;
said plurality of apertures are disposed so as to provide a plurality of bight portions distributed substantially uniformly about the circumference of said brake ring, each of said bight portions extending radially inwardly from said outer peripheral surface of said brake ring, each of said bight areas having a surface area of the metal material of said brake ring sufficient for providing a locus of expanded contact with a friction pad of a brake assembly;
said plurality of sets of two apertures comprising thirty sets of two apertures;
said plurality of sets of three apertures comprising thirty sets of three apertures;
each of said thirty sets of two apertures comprising:
a first aperture and a second aperture;
said first aperture and said second aperture both being aligned substantially along a common radius of said brake rotor;
said first aperture being one of said larger apertures;
said second aperture being one of said larger apertures;
each of said thirty sets of three apertures comprising:
a third aperture, a fourth aperture and a fifth aperture;
said third, fourth and fifth apertures all being aligned substantially along a common radius of said brake rotor;
said third aperture being one of said larger apertures;
said fourth aperture being one of said larger apertures; and
said fifth aperture being one of said smaller apertures;
each of said apertures being a generally circular hole;
each of said first, second, third and fourth apertures having a substantially equal diameter;
said fifth aperture having a diameter equal to between about three-fourths and about seven-eighths of the diameter of each of said first, second, third and fourth apertures;
said thirty sets of two apertures and said thirty sets of three apertures being disposed in an alternating relationship with one another about the circumference of said brake ring;

each of said bight portions being generally defined between:
  a first one of said fifth apertures;
  a second one of said fifth apertures, the second one of said fifth apertures neighboring said first one of said fifth apertures; and
  one of said second apertures, said one of said apertures being disposed, with respect to a circumferential direction of said brake ring, between said first one of said fifth apertures and said second one of said fifth apertures;
said brake ring having an outer diameter of between about 7 and about 15 inches;
said ceramic coating having been applied by plasma spraying;
said bond coating having been applied by plasma spraying;
said at least one connection portion comprises a plurality of lugs extending inwardly from said inner peripheral surface of said brake ring, for providing connection with a hub;
said plurality of lugs is eight lugs, said eight lugs being substantially uniformly distributed about said inner peripheral surface of said brake ring;
each of said plurality of lugs has a hole disposed therethrough to facilitate mounting of said brake ring on a hub;
said bond coating has a thickness of about 0.005"; and
said ceramic coating has a thickness of between about 0.010" and about 0.030".

16. A method of making a brake rotor, such a brake rotor comprising: a brake ring; said brake ring having first and second opposing braking surfaces, said first and second braking surfaces being oriented generally parallel to one another; said brake ring defining a central rotational axis being generally perpendicular to said first and second braking surfaces; said brake ring having: an inner peripheral surface, disposed towards said central rotational axis and generally connecting said first and second braking surfaces, and an outer peripheral surface, disposed away from said central rotational axis and generally connecting said first and second braking surfaces; a plurality of apertures being disposed in said brake ring, said plurality of apertures being configured for dissipating heat during a braking operation of said rotor; a heat-reflecting ceramic coating disposed on said first and second braking surfaces; and said ceramic coating consisting essentially of a composition comprising at least about 5 percent nickel by volume; said method comprising the steps of:
  providing a brake ring;
  configuring said brake ring to have first and second opposing braking surfaces, said first and second braking surfaces being oriented generally parallel to one another;
  defining a central rotational axis to be generally perpendicular to said first and second braking surfaces;
  said step of providing said brake ring comprising:
    providing an inner peripheral surface, disposed towards said central rotational axis and generally connecting said first and second braking surfaces; and
    providing an outer peripheral surface, disposed away from said central rotational axis and generally connecting said first and second braking surfaces;
  disposing a plurality of apertures in said brake ring;
  configuring said plurality of apertures for dissipating heat during a braking operation of said rotor;
  providing a heat-reflecting ceramic coating and disposing said ceramic coating on said first and second braking surfaces;
  configuring said ceramic coating to consist essentially of a composition comprising at least about 5 percent nickel by volume;
  configuring said plurality of apertures to comprise:
    a set of smaller apertures and a set of larger apertures;
    each of said set of smaller apertures being disposed radially closer to said outer peripheral surface than are said larger apertures;
    a plurality of sets of two apertures, wherein each set of said plurality of sets of two apertures comprises two of said larger apertures; and
    a plurality of sets of three apertures, wherein each set of said plurality of sets of three apertures comprises at least one of said larger apertures and at least one of said smaller apertures.

17. The method according to claim 16, further comprising the steps of:
  configuring said ceramic coating to have an original color prior to a braking operation;
  providing said ceramic coating with means for reflecting heat during a braking operation so as to substantially maintain the original color of said ceramic coating at braking temperatures of up to about 1200° F.

18. The method according to claim 17, further comprising the step of configuring the brake rotor such that:
  said brake ring has a bond coating disposed on both of said first and second braking surfaces, between the corresponding one of said first and second braking surfaces and said ceramic coating;
  said bond coating consists essentially of nickel;
  said composition of said ceramic coating consists essentially of:
    between about 10 percent and about 20 percent nickel by volume; and
    a zirconium-based ceramic; and
  said plurality of apertures are disposed through said brake ring and extend between said first and second braking surfaces.

19. The method according to claim 18, further comprising the step of configuring the brake rotor such that:
  said plurality of apertures are arranged in a substantially uniform pattern over substantially the entire circumference of said brake ring;
  said first and second braking surfaces each have a total surface area;
  said plurality of apertures constitute a removed surface area on each of said first and second braking surfaces, the removed surface area constituted by said plurality of apertures being about 60 percent of the total surface area of each of said first and second braking surfaces;
  said brake ring is formed from a metal material;
  said plurality of apertures are disposed so as to provide a plurality of bight portions distributed substantially uniformly about the circumference of said brake ring, each of said bight portions extending radially inwardly from said outer peripheral surface of said brake ring, each of said bight areas having a surface area of the metal material of said brake ring sufficient for providing a locus of expanded contact with a friction pad of a brake assembly;
  said plurality of sets of two apertures comprise thirty sets of two apertures;

said plurality of sets of three apertures comprise thirty sets of three apertures;
each of said thirty sets of two apertures comprising:
  a first aperture and a second aperture;
    said first aperture and said second aperture both being aligned substantially along a common radius of said brake rotor;
    said first aperture being one of said larger apertures;
    said second aperture being one of said larger apertures;
each of said thirty sets of three apertures comprising:
  a third aperture, a fourth aperture and a fifth aperture;
  said third, fourth and fifth apertures all being aligned substantially along a common radius of said brake rotor;
  said third aperture being one of said larger apertures;
  said fourth aperture being one of said larger apertures; and
  said fifth aperture being one of said smaller apertures;
each of said apertures being a generally circular hole;
each of said first, second, third and fourth apertures having a substantially equal diameter;
said fifth aperture having a diameter equal to between about three-fourths and about seven-eighths of the diameter of each of said first, second, third and fourth apertures;
said thirty sets of two apertures and said thirty sets of three apertures being disposed in an alternating relationship with one another about the circumference of said brake ring;
each of said bight portions being generally defined between:
  a first one of said fifth apertures;
  a second one of said fifth apertures, the second one of said fifth apertures neighboring said first one of said fifth apertures; and
  one of said second apertures, said one of said apertures being disposed, with respect to a circumferential direction of said brake ring, between said first one of said fifth apertures and said second one of said fifth apertures;
said brake ring having an outer diameter of between about 7 and about 15 inches;
said ceramic coating having been applied by plasma spraying;
said bond coating having been applied by plasma spraying;
said brake ring further comprises a plurality of lugs extending inwardly from said inner peripheral surface of said brake ring, for providing connection with a hub;
said plurality of lugs is eight lugs, said eight lugs being substantially uniformly distributed about said inner peripheral surface of said brake ring;
each of said plurality of lugs has a hole disposed therethrough to facilitate mounting of said brake ring on a hub;
said bond coating has a thickness of about 0.005";
said ceramic coating has a thickness of between about 0.010" and about 0.030"; and
said metal material of said brake ring consists essentially of a high carbon stress relieved steel.

20. The method according to claim 16, further comprising the step of configuring the brake rotor such that:
said brake ring is a solid brake ring;
said plurality of apertures are disposed through said brake ring;
said plurality of apertures extend through said brake ring between said first and second braking surfaces; and
said brake ring is formed from steel.

* * * * *